United States Patent
Habersetzer et al.

(10) Patent No.: US 8,910,527 B2
(45) Date of Patent: Dec. 16, 2014

(54) VORTEX FLOWMETER WITH OPTIMIZED TEMPERATURE DETECTION

(75) Inventors: Carsten Habersetzer, Nörten-Hardenberg (DE); Reinhard Steinberg, Worbis (DE)

(73) Assignee: ABB Technology AG, Zürich (CH)

( * ) Notice: Subject to any disclaimer, the term of this patent is extended or adjusted under 35 U.S.C. 154(b) by 145 days.

(21) Appl. No.: 13/336,538

(22) Filed: Dec. 23, 2011

(65) Prior Publication Data

US 2012/0160032 A1 Jun. 28, 2012

(30) Foreign Application Priority Data

Dec. 24, 2010 (DE) .......................... 10 2010 056 279

(51) Int. Cl.
*G01F 1/86* (2006.01)
*G01F 1/32* (2006.01)
*G01F 15/02* (2006.01)

(52) U.S. Cl.
CPC .............. *G01F 15/02* (2013.01); *G01F 1/3254* (2013.01); *G01F 1/3245* (2013.01); *G01F 1/3281* (2013.01); *G01F 1/3272* (2013.01); *G01F 1/3209* (2013.01)
USPC .................. 73/861.01; 73/861.21; 73/861.22; 73/204.13

(58) Field of Classification Search
USPC ................ 73/861.01, 861.21, 861.22, 204.26
See application file for complete search history.

(56) References Cited

U.S. PATENT DOCUMENTS

| | | | |
|---|---|---|---|
| 4,236,138 A * | 11/1980 | Segawa et al. .................. 338/34 |
| 4,248,098 A | 2/1981 | Sawayama et al. | |
| 4,526,040 A | 7/1985 | Matsubara | |
| 4,791,818 A | 12/1988 | Wilde | |
| 5,780,736 A * | 7/1998 | Russell ....................... 73/204.11 |
| 5,844,140 A * | 12/1998 | Seale ............................... 73/633 |
| 5,869,772 A * | 2/1999 | Storer ......................... 73/861.24 |
| 5,879,082 A * | 3/1999 | Smitherman et al. ......... 374/110 |
| 5,913,247 A * | 6/1999 | Steuer ........................ 73/861.22 |

(Continued)

FOREIGN PATENT DOCUMENTS

| | | |
|---|---|---|
| DE | 28 27 985 A1 | 5/1979 |
| DE | 287 995 A5 | 3/1991 |

(Continued)

OTHER PUBLICATIONS

English Machine translation of German Patent DE 10020932 C1, Dec. 2002, Heinrich et al.*

(Continued)

*Primary Examiner* — Lisa Caputo
*Assistant Examiner* — Philip Cotey
(74) *Attorney, Agent, or Firm* — Buchanan Ingersoll & Rooney PC

(57) ABSTRACT

Exemplary embodiments relate to a vortex flowmeter having a vortex body which projects into the flowing measurement medium in a measuring tube, a sensor for detecting the vortex frequency being connected downstream of said vortex body in the direction of flow and being provided with means for measuring the temperature of the measurement medium, and a downstream electronic evaluation unit determining the flow rate in a temperature-compensated manner, the sensor including a carrier body on which a plurality of piezoelectric elements, which are arranged at a distance from one another and are intended to measure the frequency, and a temperature-measuring element are placed.

17 Claims, 1 Drawing Sheet

(56) References Cited

U.S. PATENT DOCUMENTS

| | | |
|---|---|---|
| 6,658,945 B1 * | 12/2003 | Kleven .................... 73/861.22 |
| 2003/0061887 A1 | 4/2003 | Koudal et al. |
| 2004/0216532 A1 | 11/2004 | Koudal et al. |
| 2005/0145041 A1 | 7/2005 | Koudal et al. |
| 2006/0146909 A1 * | 7/2006 | Morse et al. .................. 374/130 |
| 2007/0195066 A1 * | 8/2007 | Bernitz et al. ................ 345/174 |
| 2007/0199338 A1 * | 8/2007 | Evans et al. .................. 62/228.4 |
| 2009/0090177 A1 * | 4/2009 | Sukegawa et al. ......... 73/204.25 |
| 2012/0325014 A1 * | 12/2012 | Pulley et al. ............... 73/861.22 |

FOREIGN PATENT DOCUMENTS

| | | | |
|---|---|---|---|
| DE | 10020932 C1 * | 12/2002 | ............ G01K 7/183 |
| DE | 102 49 543 A1 | 5/2004 | |
| EP | 0 100 931 A1 | 2/1984 | |
| WO | WO 98/43051 A2 | 10/1998 | |

OTHER PUBLICATIONS

Office Action dated Jun. 18, 2012, issued in corresponding German Patent Application No. 10 2010 056 279.3. (8 pages).

* cited by examiner

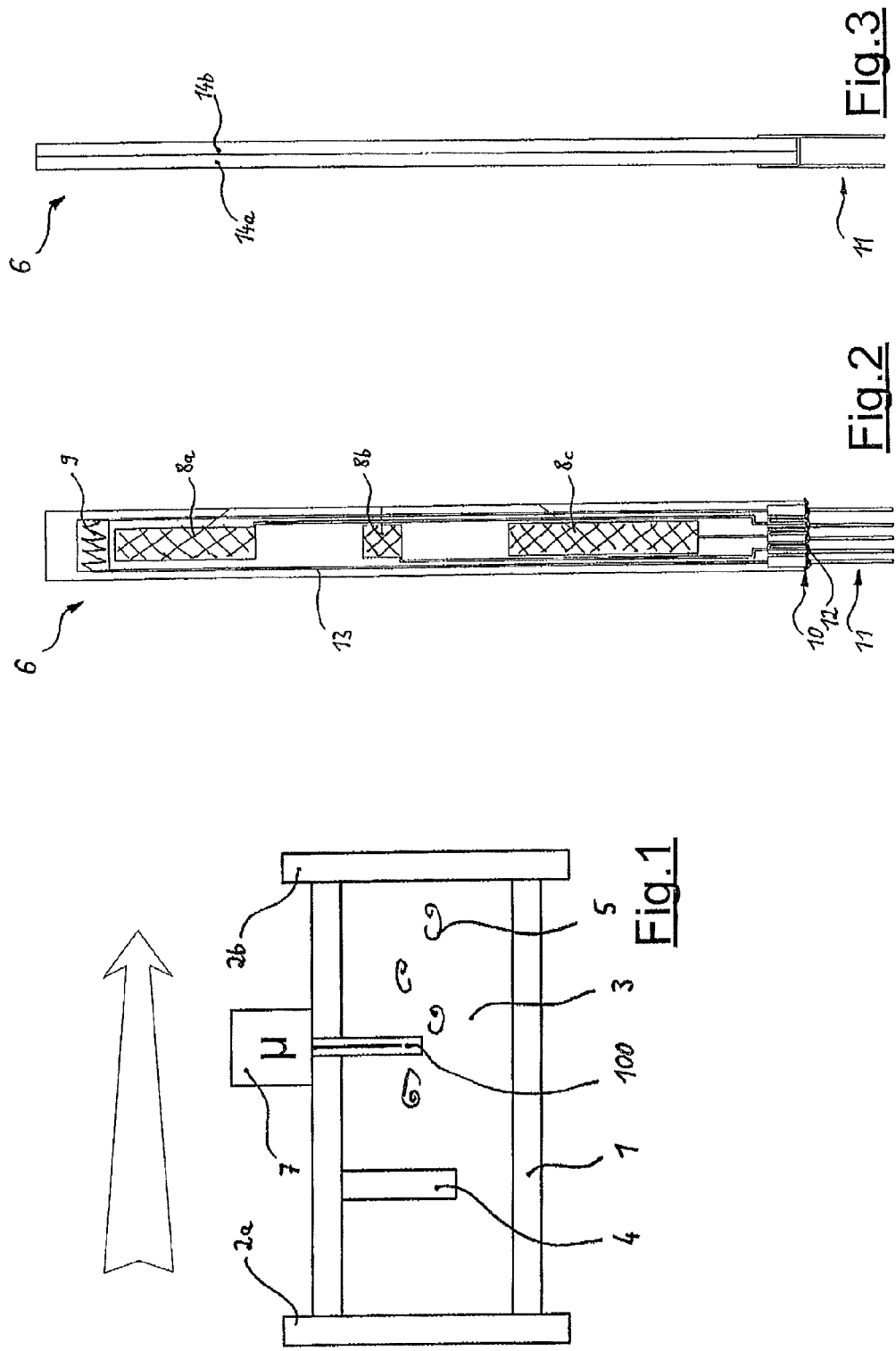

VORTEX FLOWMETER WITH OPTIMIZED TEMPERATURE DETECTION

RELATED APPLICATION

This application claims priority under 35 U.S.C. §119 to German Patent Application No. 102010056279.3 filed in Germany on Dec. 24, 2010, the entire content of which is hereby incorporated by reference in its entirety.

FIELD

The disclosure relates to a flowmeter, such as, a vortex flowmeter having a vortex body, a sensor that projects into the flowing measurement medium in a measuring tube and measures the temperature of the measurement medium, and a downstream electronic evaluation unit determining the flow rate in a temperature-compensated manner.

BACKGROUND INFORMATION

The wide variety of substances, such as chemicals, oil, gas or coolants as well as steam for transmitting energy, are transported and distributed in pipeline systems of the process engineering industry. Since these media have very different physical properties, measuring devices which are based on different measurement principles, for example also the vortex principle, exist for the purpose of determining flow rate values and other parameters. Vortex flowmeters belong to the standard measuring devices for determining the volumetric flow rate of liquids, gases and vapors. In this case, vortex flowmeters can also be used in non-conductive measurement media and thus supplement the magnetoinductive flowmeters which are likewise known.

The measurement principle of vortex flowmeters is based on the Kármán vortex street, in which case opposed vortices occur downstream of a body around which the flow passes. This phenomenon is used when measuring the vortex flow rate by introducing, into a measuring tube, a disruptive body downstream of which said vortex street forms. Since the individual vortices run in opposite directions and with an offset with respect to one another, local pressure differences form and can be detected using a downstream sensor. The so-called vortex frequency is determined using the sensor by counting the pressure pulses occurring per unit time. The greater the flow velocity, the higher the measured vortex frequency as well. In practice, the flow velocity of the measurement medium needed to form the vortex is often too low. However, installing a vortex counter in a measuring tube with a reduced tube cross section makes it possible to accordingly increase the flow velocity of the measurement medium, to be precise without restricting the measurement accuracy. The temperature sensor optionally installed in the sensor provides additional possible uses. In this manner, it is also possible to calculate temperature-dependent masses and thermal flows, which is specified, in particular, in auxiliary industrial circuits with saturated steam or gas.

In known systems, different types of sensors are used for detecting the vortex frequency, such as the frequency of the vortex separations downstream of the vortex body. Capacitive sensors, thermistors, diaphragms, strain gauges, fiber optic sensors and ultrasonic sensors or piezoelectric elements are used, inter alia, for this purpose.

WO 98/43051 A1 discloses a vortex flowmeter of the generic type in which a sensor for detecting the vortex frequency is arranged in a measuring tube. An electronic evaluation unit which is connected downstream of the sensor and has a filter circuit that receives the measurement signal from the sensor and calculates an output value which indicates the fluid flow rate. An additional temperature sensor detects the temperature of the measurement medium and generates a supplementary measured temperature value, while a likewise additional pressure sensor provides the electronic evaluation unit with the pressure of the measurement medium for the purpose of signal processing. The electronic evaluation unit calculates a calibration factor as a function of the output signal, the temperature value and the pressure value for use in calculating the output value which indicates the flow rate of the measurement medium.

Integrating the additional sensors for determining the pressure and, in particular, the temperature in the sensor system coming into contact with the measurement medium specifies a large outlay on components. The individual sensors also need to be wired to one another, which increases the installation complexity.

Exemplary embodiments of the present disclosure provide a vortex flowmeter having a sensor for detecting the vortex frequency, the temperature-measuring means of which have a simple design and can be inserted into the sensor system with little effort.

Exemplary embodiments of the present disclosure provide that the sensor for detecting the vortex frequency includes (e.g., consists of) a carrier body on which a plurality of piezoelectric elements, which are arranged at a distance from one another and are intended to measure the frequency, and a temperature-measuring element are placed.

An advantageous result of the exemplary embodiments disclosed herein provides, that the means for measuring the temperature are not in the form of an independent sensor component but rather are part of the sensor for detecting the vortex frequency and form a functional unit with the carrier body of said sensor.

Instead of the piezoelectric elements, it is also possible to use other suitable measuring sensors within the scope of the disclosed exemplary embodiments provided that said sensors can be applied to the carrier body in the manner according to the respective exemplary embodiments.

The carrier body can include (e.g., consists of) a ceramic material, at least the piezoelectric elements being fixed to the carrier body in a manner embedded in ceramic cement. As a result, the piezoelectric elements can be reliably connected to the ceramic carrier body in such a manner that the vibrations of the carrier body are reliably forwarded to the piezoelectric elements for measurement.

In an exemplary embodiment, the carrier body is formed from two carrier body halves, which are adhesively bonded to one another and enclose the piezoelectric elements and the temperature-measuring element. Two cuboidal basic bodies which have an elongated shape and are intended to have recesses for accommodating the piezoelectric elements and the temperature-measuring element in the side surfaces which come into contact with one another are suitable as carrier body halves.

The plurality of contacts which are needed to connect the piezoelectric elements and the temperature-measuring element should be arranged together on the end side at the proximal end of the carrier body. The electrical signal cables which continue on can be reliably fitted at this position without impeding the vibrational properties of the carrier body or coming into contact with the measurement medium. Each piezoelectric element and the temperature-measuring element should be connected via an associated pair of electrical contacts.

In order to additionally protect the electrical connection of the signal cables to the electrical contacts, it is proposed that this contact-making region is provided with a glass cover in a fixed position in order to fix the signal cables in their position relative to the sensor. The signal cables can be connected to the electrical contacts of the sensor with an integral material joint by means of welding and are covered with the glass cover.

According to another exemplary embodiment, a total of three piezoelectric elements are arranged at a distance from one another between the electrical contacts at the proximal end of the carrier body, on the one hand, and the temperature-measuring element at the distal end of the carrier body, on the other hand. As a result, the individual sensor components can be functionally accommodated along the elongated carrier body. Since the temperature-measuring element is positioned at the distal end of the carrier body, it projects into the flowing measurement medium to the maximum extent in order to reliably measure the temperature.

An electrical resistance thermometer, especially a PT100 sensor which, available as a standardized component, can be integrated on the carrier body in a space-saving manner, is suitable, in particular, as the temperature-measuring element.

According to another exemplary embodiment for producing the sensor system of the carrier body, the temperature-measuring element, the electrical conductor tracks connecting the latter and the piezoelectric elements, including the electrical contacts on the end side, and also the contact areas for the piezoelectric elements to be used are produced by vapor-depositing a precious metal on the ceramic carrier body. Platinum which produces the abovementioned components after vapor deposition and subsequent laser treatment is suitable, in particular, for this purpose. This can be implemented in a simple manner in terms of process engineering in series production.

The contact areas produced in the above way for the piezoelectric elements can be connected to the latter by a conductive adhesive producing an area contact and a wrap-around contact. A polyimide conductive adhesive can be used as the electrical conductive adhesive.

In order to electrically insulate the individual components, another exemplary embodiment includes a measure in which at least the temperature-measuring element and the conductor tracks are provided with a glass layer applied thereto. This glass layer is supplemented, in the region of the outer electrical contacts, with the abovementioned glass cover in the contact-making region, thus producing continuous insulation.

In order to additionally seal against moisture, the outside of the entire sensor can be coated with a plastic layer which likewise can include (e.g., consists of) a polyimide film. The carrier body of the sensor may be additionally cemented in a metal sleeve so that the flowing measurement medium cannot damage the carrier body of the sensor as a result of direct contact.

SUMMARY

An exemplary vortex flowmeter is disclosed, comprising: a vortex body which projects into the flowing measurement medium in a measuring tube; a sensor for detecting the vortex frequency being connected downstream of said vortex body in the direction of flow and including means for measuring the temperature of the measurement medium; and a downstream electronic evaluation unit determining the flow rate in a temperature-compensated manner, wherein the sensor includes a carrier body on which a plurality of piezoelectric elements, which are arranged at a distance from one another and are intended to measure the frequency, and a temperature-measuring element are placed.

BRIEF DESCRIPTION OF THE DRAWINGS

Further measures which improve the embodiments are described in more detail below together with the description of a selected exemplary embodiment using the figures, in which:

FIG. 1 shows a diagrammatic side view of a vortex flowmeter in accordance with an exemplary embodiment;

FIG. 2 shows a front view of a carrier body as a rocker pin of the sensor in accordance with an exemplary embodiment; and FIG. 3 shows a side view of the carrier body according to FIG. 2 in accordance with an exemplary embodiment.

DETAILED DESCRIPTION

FIG. 1 shows a diagrammatic side view of a vortex flowmeter in accordance with an exemplary embodiment. As shown in FIG. 1, a vortex flowmeter includes (e.g., consists of) a steel measuring tube 1 which is used in a pipeline system (not illustrated in any more detail) of a process engineering installation. For this purpose, a respective connection flange 2a and 2b is provided at both ends of the measuring tube 1. A liquid measurement medium 3 flows through the measuring tube 1 in the direction illustrated by the arrow. This flow is disrupted by a vortex body 4 which projects into the measuring tube 1, with the result that a vortex street including (e.g., consisting of) individual vortices 5 forms downstream of the vortex body 4 in the direction of flow.

The frequency of the vortices which is produced by the vortex street and is proportional to the flow rate of the measurement medium 3 through the measuring tube 1 can be detected using a downstream sensor 100 which is also provided with means for measuring the temperature of the measurement medium 3. On the input side, the measured frequency and temperature value is supplied to an electronic evaluation unit 7 which calculates the flow rate of the measurement medium 3 through the measuring tube 1 in a temperature-compensated manner.

FIG. 2 shows a front view of a carrier body as a rocker pin of the sensor in accordance with an exemplary embodiment. As shown in FIG. 2, the sensor 100 includes a carrier body 6 which is made of a ceramic material and on which a total of three piezoelectric elements 8a-8c, which can be arranged at a distance from one another and intended to measure the frequency. A temperature-measuring element 9 is also placed at the distal end of the carrier body 6. In order to electrically connect the piezoelectric elements 8a-8c and the temperature-measuring element 9, a plurality of electrical contacts 10 can be arranged on the end side of the carrier body 6. Individual signal cables 11 (exemplary) which are fixed in position with a glass cover 12 can be welded to the electrical contacts 10.

Between the temperature-measuring element 9 and each of the piezoelectric elements 8a-8c, conductor tracks 13 (exemplary) run to the respective associated electrical contacts 10 on the end side. The electrical conductor tracks 13, including the electrical contacts 10, as well as contact areas for the piezoelectric elements 8a-8c and the temperature-measuring element 9 can be produced by vapor-depositing platinum on the ceramic carrier body 6. In this case, the piezoelectric elements 8a-8c are each fitted to the associated contact areas of the carrier body 6 by means of an area contact and a wrap-around contact using a conductive adhesive.

FIG. 3 shows a side view of the carrier body according to FIG. 2 in accordance with an exemplary embodiment. As shown in FIG. 3, the carrier body 6 of the sensor for detecting the vortex frequency includes (e.g., consists of) two carrier body halves 14a and 14b which, adhesively bonded to one another, enclose the piezoelectric elements 8a-8c and the temperature-measuring element 9. The carrier body 6 is cemented in a metal sleeve (not illustrated in any more detail) which comes into contact with the flowing measurement medium inside the measuring tube.

The embodiments are not restricted to the exemplary embodiments described above. Rather, modifications thereof which are concomitantly included in the scope of protection of the following claims are also conceivable. For example, it is also possible to use other suitable measuring sensors to detect the frequency of the vortices instead of the piezoelectric elements. Furthermore, the number of such measuring sensors depends on the measurement principle and on the quality of the specified measurement signal.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Measuring tube
2 Connection flange
3 Measurement medium
4 Vortex body
5 Vortex
6 Carrier body
7 Evaluation unit
8 Piezoelectric element
9 Temperature-measuring element
10 Electrical contacts
11 Signal cable
12 Glass cover
13 Electrical conductor tracks
14 Carrier body half
100 Sensor

What is claimed is:

1. A vortex flowmeter comprising:
a vortex body which projects into a flowing measurement medium in a measuring tube;
a sensor for detecting a vortex frequency is connected downstream of said vortex body in a direction of flow and includes means for measuring a temperature of the measurement medium; and
a downstream electronic evaluation unit determining a flow rate in a temperature-compensated manner,
wherein the sensor includes a carrier body on which a plurality of piezoelectric elements, which are arranged at a distance from one another and are intended to measure the vortex frequency, the temperature-measuring element, and electrical conductor tracks are placed,
wherein the carrier body includes a ceramic material,
wherein at least the piezoelectric elements are embedded in ceramic cement that is fixed to the carrier body,
wherein the temperature-measuring element, the electrical conductor tracks including electrical contacts, and contact areas of the piezoelectric elements include a precious metal, which is vapor-deposited on the ceramic carrier body, and
wherein a plurality of electrical contacts for connecting the piezoelectric elements and the temperature-measuring element are arranged together on an end side at a proximal end of the carrier body.

2. The vortex flowmeter as claimed in claim 1, wherein the carrier body includes two carrier body halves which are adhesively bonded to one another and enclose the piezoelectric elements and the temperature-measuring element.

3. The vortex flowmeter as claimed in claim 1, wherein signal cables fitted to the electrical contacts with an integral material joint are fixed in position in a contact-making region with a glass cover.

4. The vortex flowmeter as claimed in claim 1, wherein the plurality of piezoelectric elements are arranged at a distance from one another between the electrical contacts at a proximal end of the carrier body, and the temperature-measuring element at a distal end of the carrier body.

5. The vortex flowmeter as claimed in claim 1, wherein the temperature-measuring element is an electrical resistance thermometer.

6. The vortex flowmeter as claimed in claim 1, wherein each piezoelectric element is fitted to associated contact areas of the carrier body by means of an area contact and a wrap-around contact using a conductive adhesive.

7. The vortex flowmeter as claimed in claim 1, wherein the temperature-measuring element and the electrical conductor tracks are electrically insulated with a glass layer applied thereto.

8. The vortex flowmeter as claimed in claim 1, wherein, for protection against moisture, an outside of the sensor is coated with a plastic layer.

9. The vortex flowmeter as claimed in claim 1, wherein the carrier body of the sensor is cemented in a metal sleeve.

10. The vortex flowmeter as claimed in claim 1, wherein the temperature-measuring element, the electrical conductor tracks, including electrical contacts, and contact areas of the piezoelectric elements are produced by vapor-depositing a precious metal on the ceramic carrier body.

11. The vortex flowmeter as claimed in claim 2, wherein the temperature-measuring element, the electrical conductor tracks, including electrical contacts, and contact areas of the piezoelectric elements are produced by vapor-depositing a precious metal on the ceramic carrier body.

12. The vortex flowmeter as claimed in claim 1, wherein the temperature-measuring element, the electrical conductor tracks, including electrical contacts, and contact areas of the piezoelectric elements are produced by vapor-depositing a precious metal on the ceramic carrier body.

13. The vortex flowmeter as claimed in claim 1, wherein, for protection against moisture, an outside of the sensor is coated with a plastic layer.

14. The vortex flowmeter as claimed in claim 2, wherein, for protection against moisture, an outside of the sensor is coated with a plastic layer.

15. The vortex flowmeter as claimed in claim 1, wherein, for protection against moisture, an outside of the sensor is coated with a plastic layer.

16. The vortex flowmeter as claimed in claim 1, wherein the carrier body of the sensor cemented in a metal sleeve.

17. The vortex flowmeter as claimed in claim 2, wherein the carrier body of the sensor cemented in a metal sleeve.

* * * * *